US010289852B2

(12) United States Patent
Han et al.

(10) Patent No.: US 10,289,852 B2
(45) Date of Patent: *May 14, 2019

(54) USING BIOMETRIC VERIFICATION TO GRANT ACCESS TO REDACTED CONTENT

(71) Applicant: Apple Inc., Cupertino, CA (US)

(72) Inventors: Byron Bay Han, San Jose, CA (US); Craig Alan Marciniak, San Jose, CA (US); Andrew Roger Whalley, San Francisco, CA (US); Matthew Elliott Shepherd, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,209

(22) Filed: Jul. 11, 2017

(65) Prior Publication Data
US 2018/0089441 A1 Mar. 29, 2018

Related U.S. Application Data

(63) Continuation of application No. 13/913,403, filed on Jun. 8, 2013, now Pat. No. 9,721,107.

(51) Int. Cl.
G06F 7/04 (2006.01)
G06F 21/60 (2013.01)
(Continued)

(52) U.S. Cl.
CPC .............. *G06F 21/60* (2013.01); *G06F 21/32* (2013.01); *G06F 21/6245* (2013.01)

(58) Field of Classification Search
CPC ....... G06F 21/32; G06F 21/60; G06F 21/6245
(Continued)

(56) References Cited

U.S. PATENT DOCUMENTS 8,782,775 B2 7/2014 Fadell et al.
8,867,741 B2 * 10/2014 McCorkindale ......... H04N 1/44
380/243
(Continued)

FOREIGN PATENT DOCUMENTS

CN 102223447 A 10/2011
TW 201125339 A 7/2011
(Continued)

OTHER PUBLICATIONS

International Search Report and Written Opinion for PCT International Appln No. PCT/US2014/033089 dated Sep. 29, 2014 (11 pages).

(Continued)

*Primary Examiner* — Samson B Lemma
(74) *Attorney, Agent, or Firm* — Womble Bond Dickinson (US) LLP

(57) ABSTRACT

Some embodiments provide an electronic device with a novel content redaction engine. The content redaction engine of some embodiments determines whether to redact content for output based on whether a user is biometrically verified. When the content redaction engine receives verification data indicating that the user is biometrically verified, the device displays content without any portion redacted. On the other hand, when the content redaction engine does not receive such verification data, the device displays the content with at least a portion redacted. The electronic device of some embodiments additionally includes a biometric reader and a biometric verification engine. The biometric reader reads a person's uniquely identifying biometric data (e.g., thumbprint/fingerprint, iris scan, voice, etc.). This biometric information is then read by the biometric verification engine for comparison to a stored set of verified user biometric data.

(Continued)

When the biometric data matches the stored data, the person is verified.

24 Claims, 14 Drawing Sheets

(51) Int. Cl.
G06F 21/32 (2013.01)
G06F 21/62 (2013.01)

(58) Field of Classification Search
USPC .............. 726/26, 28, 4–5, 17–18; 713/186
See application file for complete search history.

(56) References Cited

U.S. PATENT DOCUMENTS

| | | | |
|---|---|---|---|
| 8,943,580 B2 | 1/2015 | Fadell et al. | |
| 9,052,197 B2 | 6/2015 | van Os et al. | |
| 9,089,270 B2* | 7/2015 | Song | A61B 5/02438 |
| 9,425,492 B2* | 8/2016 | Mao | H01M 2/1072 |
| 9,953,152 B2 | 4/2018 | Fadell et al. | |
| 2001/0045458 A1* | 11/2001 | Polansky | G06K 19/10 |
| | | | 235/382 |
| 2002/0095586 A1* | 7/2002 | Doyle | G06F 21/32 |
| | | | 713/186 |
| 2006/0259983 A1 | 11/2006 | Sperry | |
| 2009/0164878 A1* | 6/2009 | Cottrille | G06F 21/6245 |
| | | | 715/210 |
| 2011/0119576 A1 | 5/2011 | Aumann | |
| 2012/0034901 A1* | 2/2012 | Xiao | H04M 1/67 |
| | | | 455/411 |
| 2012/0331548 A1* | 12/2012 | Tseng | G06F 21/31 |
| | | | 726/19 |
| 2013/0111345 A1 | 5/2013 | Newman et al. | |
| 2013/0111415 A1 | 5/2013 | Newman et al. | |
| 2013/0160141 A1* | 6/2013 | Tseng | G06F 21/6245 |
| | | | 726/28 |
| 2014/0162598 A1* | 6/2014 | Villa-Real | H04M 1/66 |
| | | | 455/411 |

FOREIGN PATENT DOCUMENTS

| | | |
|---|---|---|
| TW | 201235880 A | 9/2012 |
| WO | 2014197112 A1 | 12/2014 |

OTHER PUBLICATIONS

Search Report for Taiwan Patent Application No. 13112180 dated Apr. 22, 2015, 1 page.

PCT International Preliminary Report on Patentability for PCT/US2014/033089 dated Dec. 17, 2015, 9 pages.

* cited by examiner

USING BIOMETRIC VERIFICATION TO GRANT ACCESS TO REDACTED CONTENT

This application is a continuation of co-pending U.S. patent application Ser. No. 13/913,403 filed on Jun. 8, 2013.

BACKGROUND

One concern with electronic devices, and especially with portable devices, is the ability of others to access one's device. Users of portable electronic devices (e.g., smart phones, tablet computers, etc.) will often leave their devices out where others might be able to pick them up and see what is on the screen. Thus, many such devices are protected by "locking" the device until an unlock code is entered (e.g., by entering a series of numbers and/or movements on a touchscreen).

However, some devices will display certain messages or portions of a message without requiring the user to unlock the device. For instance, when text (SMS) or e-mail messages are received, some devices display those messages or a portion of the message while in the locked-screen mode. This enables the user to quickly see what messages he or she has received without the hassle of unlocking the device. The downside, however, is that others may be able to pick up the device and view the message or a portion of the message intended for the user.

BRIEF SUMMARY

Some embodiments provide an electronic device with a novel content redaction engine. The content redaction engine of some embodiments determines whether to redact content for output based on whether a user is biometrically verified. That is, when the content redaction engine receives verification data indicating that the user is biometrically verified, the device displays content without any portion redacted. On the other hand, when the content redaction engine does not receive such verification data, the device displays the content with at least a portion redacted.

The electronic device of some embodiments additionally includes a biometric reader and a biometric verification engine. The biometric reader reads a person's uniquely identifying biometric data (e.g., thumbprint/fingerprint, iris scan, voice, etc.). This biometric information is then read by the biometric verification engine for comparison to a stored set of verified user biometric data. When the biometric data matches the stored data, the person is verified.

The content redaction engine of some embodiments includes an interface with the biometric verification engine that allows the redaction engine to request whether the biometric reader is currently receiving verified biometric data. When the biometric reader is currently receiving verified data, the content redaction engine displays content without redaction. In some embodiments, as soon as the biometric reader is no longer receiving verified data (e.g., as soon as a user removes her thumb from a thumbprint reader), the content redaction engine redacts for display any content marked as redacted. That is, there is no grace period during which the content is displayed without redaction after the biometric reader stops receiving the verified biometric input.

When redacting content for display, different embodiments perform the redaction differently. For instance, some embodiments either blur redacted content or use a black bar over the redacted content, while other embodiments do not display the redacted content. Some embodiments use different redaction methods in different situations.

Furthermore, various different embodiments include different situations for when to redact content. Some embodiments redact messages displayed in a locked-screen mode of the electronic device until verified biometric data is received. When certain electronic devices (e.g., certain smart phones) are in lock-screen mode, these devices display notifications of incoming messages, such as e-mails, short message service (SMS) messages, etc. The notifications may include some or all of the content of the message. In some embodiments, the content redaction engine redacts (e.g., via blurring, removal, etc.) the message content from the display unless verified biometric data is received. Thus, a non-owner of the device who does not have permission to view the messages will not have the ability to do so, while the owner of the device can view her messages without the requirement of unlocking the device.

In addition to the content redaction engine, some embodiments include a content redaction tool that allows a user to specify content of a document (e.g., an e-mail, text message, PDF document, etc.) for redaction. With the tool, the user can select portions of content within the document (e.g., specific text, images, etc.) that the tool marks for redaction. Thus, the document in some embodiments stores data indicating which portions have been marked for redaction. In addition, the user may specify permissions, such as different contacts that may view the redacted portions. When an electronic device (either the device on which the content was redacted, or a different user's device) displays the document, the content redaction engine of the device determines whether to display the redacted content based on a combination of the redaction permissions and biometric verification data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide an electronic device with a novel content redaction engine. The content redaction engine of some embodiments determines whether to redact content for output based on whether a user is biometrically verified. That is, when the content redaction engine receives verification data indicating that the user is biometrically verified, the device displays content without any portion redacted. On the other hand, when the content redaction engine does not receive such verification data, the device displays the content with at least a portion redacted.

Figure 1:
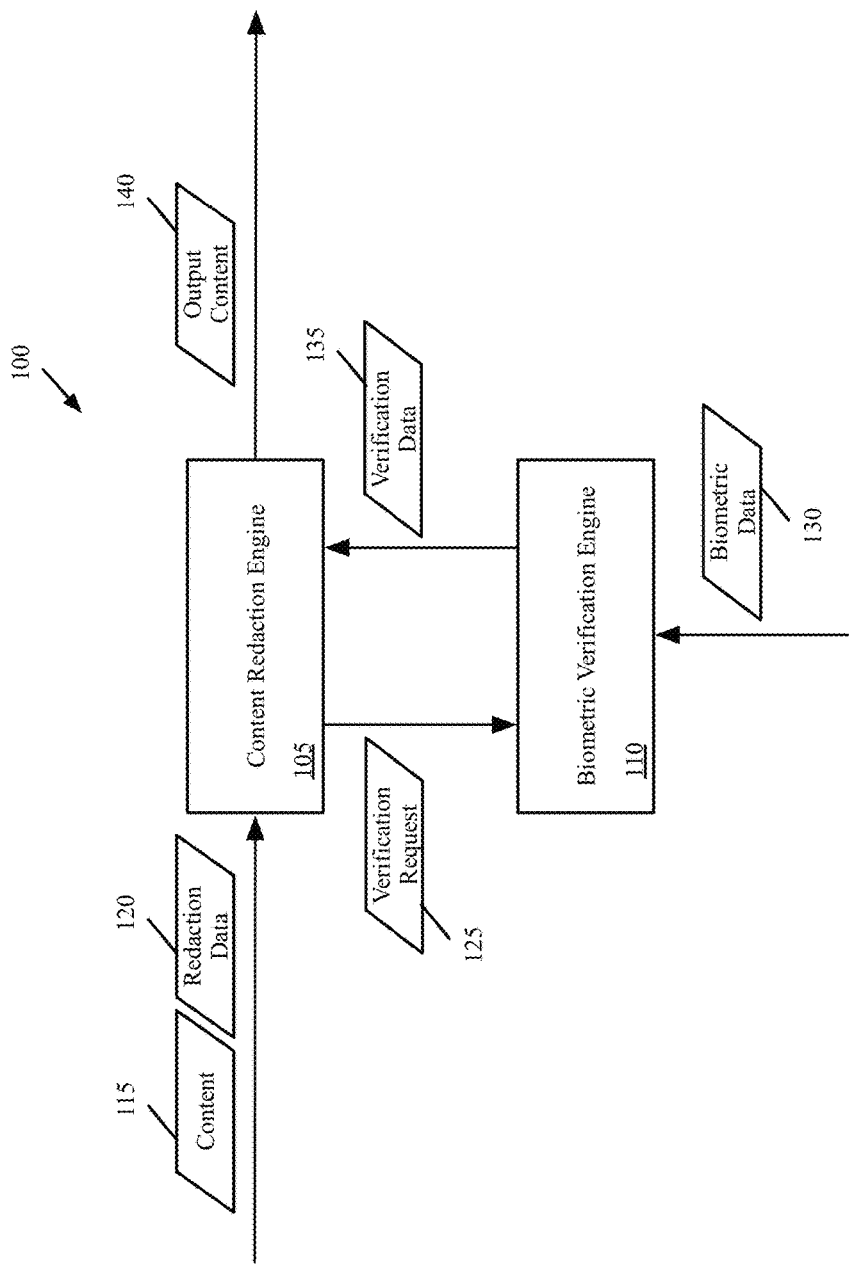
FIG. 1 conceptually illustrates an electronic device of some embodiments for allowing access to redacted content based on biometric data.

FIG. 1 conceptually illustrates such an electronic device 100 of some embodiments for allowing access to redacted content based on biometric data. The electronic device 100 includes a content redaction engine 105 and a biometric verification engine 110. The content redaction engine 105 receives content along with redaction data for the content that indicates what portion of the content should be redacted. The content redaction engine 105 then uses data indicating whether a user is biometrically verified in order to determine how to output the content (i.e., whether to display the redacted content). In some embodiments, the content redaction engine 105 receives the biometric verification data through an interface with the biometric verification engine 110 that allows the content redaction engine to request whether a biometric reader is currently receiving The biometric verification engine 110 receives biometric data (e.g., from a biometric reader) and compares the received biometric data to stored biometric data for one or more verified users. When the received data is close enough to matching the stored biometric data for one of the verified users, the verification engine 110 determines that the current user of the electronic device is verified (e.g., to perform a particular action with the device, view particular content with the device, etc.). The biometric verification engine of some embodiments sends verification data to the content redaction engine 105 indicating whether a verified user is currently using the device.

In some embodiments, the electronic device additionally includes a biometric reader, not shown in this figure. The biometric reader reads a person's uniquely identifying biometric data (e.g., thumbprint/fingerprint, iris scan, voice print, etc.). For instance, the electronic device of some embodiments combines one of its hardware buttons (e.g., a home button) with a thumbprint/fingerprint reader. The biometric reader sends the biometric information to the biometric verification engine 110 for the mentioned comparison to stored verified biometric data.

Figure 2:
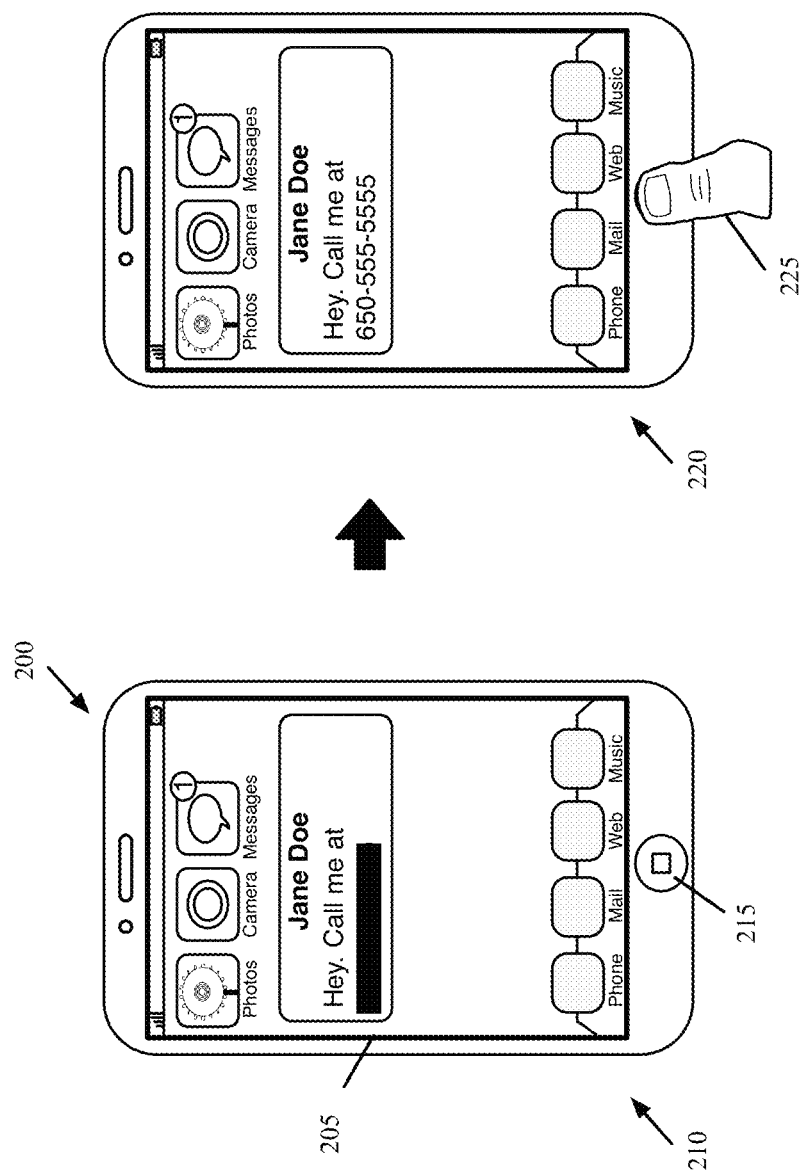
FIG. 2 illustrates an electronic device that allows access to redacted content based on biometric data.

The operation of the electronic device 100 will now be described, in part by reference to FIG. 2. FIG. 2 illustrates an electronic device 200 that allows access to redacted content based on biometric data. This figure illustrates two stages 210 and 220 of the electronic device 200, which includes a display screen 205 and a home button 215. The home button 215 is also a fingerprint/thumbprint reader.

Returning to FIG. 1, the content redaction engine 105 receives content 115 for output and associated redaction data 120. The content 115 may be text content, graphical content, or other displayed content, as well as audio content or other types of content that may be output. The redaction data 120 of some embodiments indicates portions of the content 115 for the redaction engine 105 to redact for output unless verified biometric data is received.

Before outputting the content, the content redaction engine 105 sends a request 125 to the biometric verification engine 110 to determine whether the electronic device 100 is currently receiving verified biometric data. The biometric verification engine 110 receives biometric data 130 (e.g., from a biometric reader). In some embodiments, the biometric verification engine 110 queries the biometric reader for the biometric data when it needs to make a verification determination. In other embodiments, the biometric reader sends any data it receives to the biometric verification engine 110, irrespective of whether the verification engine requires the data. For instance, referring to electronic device 200, anytime a user places a finger or thumb on the home button 215, the fingerprint data is sent to the biometric verification engine. The biometric verification engine compares the received biometric data 130 to stored data for allowed users to determine whether the current biometric data 130 matches that for one of the users.

The biometric verification engine 110 then returns verification data 135 to the content redaction engine 105. The verification data 135 of some embodiments is a yes or no answer as to whether a verified user is currently using the device. In other embodiments, the biometric verification engine 110 provides the content redaction engine with more specific information that indicates the particular user to whom the provided biometric data matched. When the redaction data indicates different permissions for different users, this information enables more fine-grained decision-making by the content redaction engine 105.

The content redaction engine 105 then outputs the content 140, either in redacted or non-redacted form. When the current user is verified by the biometric verification engine 110, the content redaction engine 105 outputs the content without redaction. On the other hand, when the user is not verified, the content redaction engine 105 outputs the content in redacted form.

FIG. 2, as mentioned, illustrates two stages 210 and 220 of an electronic device 200. In the first stage 210, the electronic device 200 displays a message (from Jane Doe) in redacted form on the display screen 205. In this situation, a portion of the message is redacted using a black bar over the content. This information may be automatically detected by the device as redacted content (e.g., because it is a phone number) or may have been marked for redaction by the sender of the message.

When redacting content for display, different embodiments perform the redaction differently. For instance, various different embodiments blur redacted content, use a black (or other color) bar over the redacted content (as in FIG. 2), apply a pattern such as cross-hatching to render the content unreadable, etc., while other embodiments do not display the redacted content. Some embodiments use different redaction methods in different situations.

Furthermore, various different embodiments include different situations for when to redact content. Some embodiments redact messages displayed in a locked-screen mode of the electronic device until verified biometric data is received. When certain electronic devices (e.g., certain smart phones) are in lock-screen mode, these devices display notifications of incoming messages, such as e-mails, short message service (SMS) messages, etc. The notifications may include some or all of the content of the message. In some embodiments, the content redaction engine redacts (e.g., via blurring, removal, etc.) the message content from the display unless verified biometric data is received. Thus, a non-owner of the device who does not have permission to view the messages will not have the ability to do so, while the owner of the device can view her messages without the requirement of unlocking the device.

The second stage 220 of FIG. 2 illustrates a verified user placing her thumb 225 on the home button 215. As the home button 215 also serves as a fingerprint reader, the electronic device 200 receives biometric (e.g., thumbprint) data, which it verifies by comparing the thumbprint to a set of finger and thumbprints for allowed users. Because the user is verified, the electronic device outputs the entire message without redaction in the second state 220 (including the sender's phone number).

In some embodiments, as soon as the biometric reader is no longer receiving verified data (e.g., as soon as a user removes her thumb from the home button 225), the content redaction engine redacts for display any content marked as redacted. That is, there is no grace period during which the content is displayed without redaction after the biometric reader stops receiving the verified biometric input.

In addition to the content redaction engine, some embodiments include a content redaction tool that allows a user to specify content of a document (e.g., an e-mail, text message, PDF document, etc.) for redaction. With the tool, the user can select portions of content within the document (e.g., specific text, images, etc.) that the tool marks for redaction. Thus, the document in some embodiments stores data indicating which portions have been marked for redaction. In addition, the user may specify permissions, such as different contacts that may view the redacted portions. When an electronic device (either the device on which the content was redacted, or a different user's device) displays the document, the content redaction engine of the device determines whether to display the redacted content based on a combination of the redaction permissions and biometric verification data.

FIGS. 1 and 2 illustrate examples of the use of biometric data to grant access to redacted content according to some embodiments. Several more detailed examples are described below. Section I describes the redaction of content when a device is in locked-screen mode. Section II then describes the content redaction process of some embodiments. Next, Section III describes the content redaction tool of some embodiments that enables users to redact content from documents. Finally, Section IV describes an electronic system with which some embodiments of the invention are implemented.

I. Redaction in Locked Mode

The electronic device of some embodiments has the ability to be locked, such that a series of inputs known only to its owner or a select group of users enables access to the device. However, many such devices (e.g., many smart phones) include a notification center when in locked mode that presents recently received (i.e., since the last time the device was unlocked) messages and other notifications (e.g., notifications of missed calls). These messages include, in some embodiments, e-mails, short message services (SMS, or text) messages, or other message formats. Such a notification center enables a non-owner of the device to see incoming messages without needing to unlock the device. Thus, some embodiments redact the messages in the notification center unless the user (i.e., the person handling the device) is verified biometrically. Upon receiving verified biometric data, the electronic device displays the messages in non-redacted form.

Figure 3:
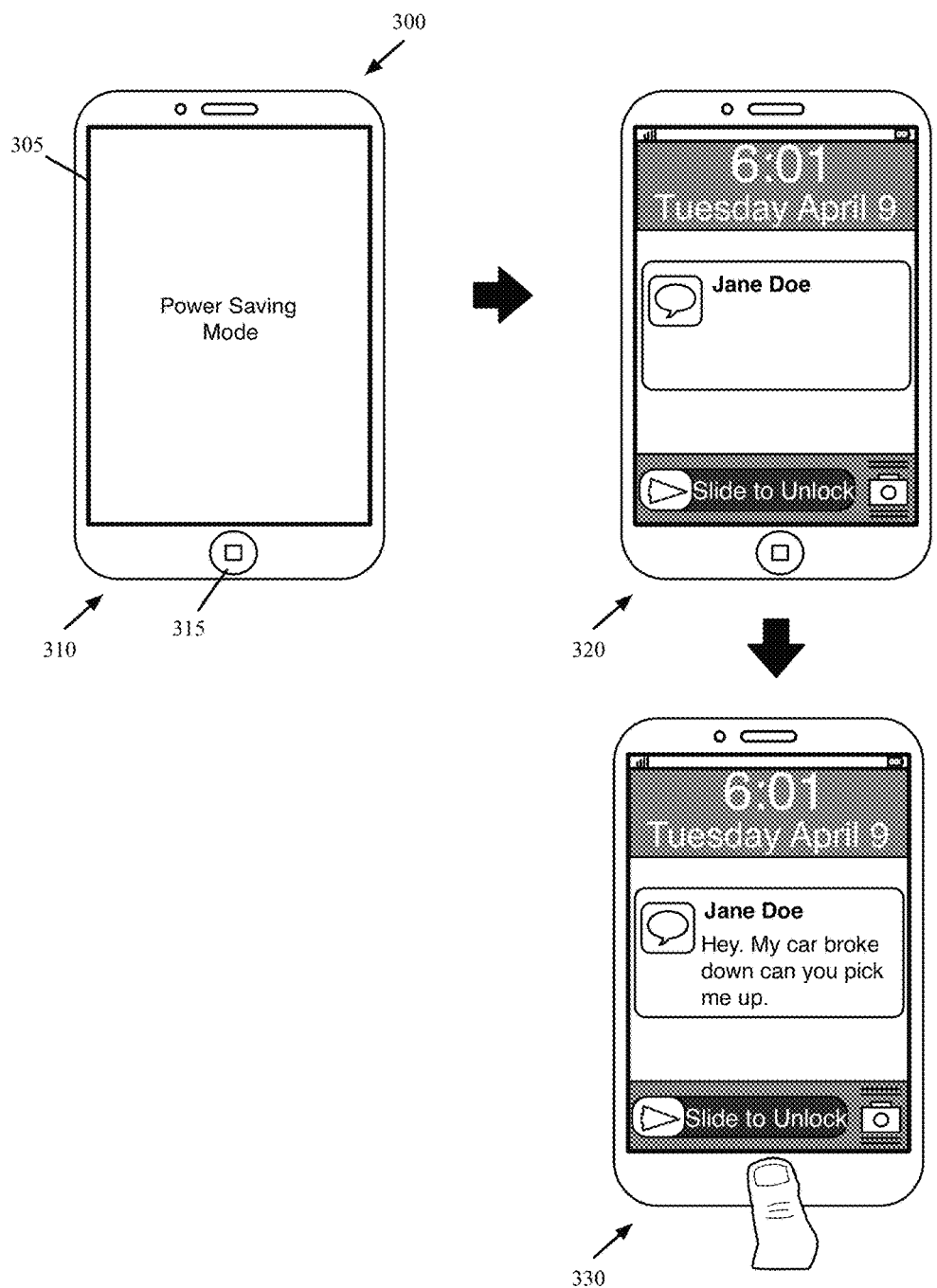
FIGS. 3 and 4 illustrate examples of electronic devices that display messages in non-redacted form upon receiving biometric data.

FIG. 3 illustrates an example of such an electronic device 300 over three stages 310-330. In this case, the electronic device 300 is a smart phone, and therefore capable of receiving various types of communication (e.g., SMS messages, e-mails, etc.). The electronic device 300 includes a display screen 305 and a button 315 which also serves as a fingerprint/thumbprint reader. In this case, the display screen 305 is a touchscreen, though in other embodiments the display screen is not a touchscreen (e.g., the device uses a built-in keyboard for input). In addition, the content redaction principles described herein may be applied to non-portable devices or other types of portable devices (e.g., a desktop computer, laptop computer, etc. could require biometric verification in order to view otherwise redacted content).

In the first stage 310, the electronic device is in power saving mode. In power saving mode, the device is locked and requires specific input (e.g., a particular touchscreen gesture followed by a series of inputs on a touchscreen number pad) in order for a user to access the device (e.g., to access various applications that operate on the device). While this figure shows the display screen 305 with the words "Power Saving Mode", this is shown for explanatory purposes. In some embodiments, the display screen 305 is blank (i.e., there is no output) when the device 300 is in power-saving mode.

In the second stage 320, the device 310 has received a text (SMS) message from Jane Doe. Thus, some embodiments of the device automatically enter a locked-screen mode in which the device outputs a display but is still not unlocked. The locked-screen mode of some embodiments includes a notification center that displays notifications for any recently-received activity. This activity may include various types of messages (e.g., e-mail, SMS messages), notifications of incoming calls and/or voicemails, activity in currently running applications, etc.

In the example shown in stage 320 of FIG. 3, the notification center displays a notification of a text message from Jane Doe. However, while the notification center includes the sender name, the body of the message is redacted. This prevents an unauthorized user from reading the message from Jane Doe, which may be personal and which the owner of the device may not want others to read.

Thus, whether the unauthorized user is a family member, a friend, or an unknown person who happens to be able to view the screen 305 of the electronic device 300, that person will not be able to read the message.

In some embodiments, an authorized user may be able to view the contents of the message in two different ways. First, the user could unlock the device 300. The locked-screen display of stage 320 includes a "slide to unlock" feature at the bottom, indicating that the user may perform a drag gesture over the particular portion of the touchscreen 305 in order to initiate the opportunity to enter an unlock code. In some embodiments, performing this gesture causes the device 300 to display a number pad on the touchscreen through which the user may enter an unlock code.

However, the user may not wish to perform such an action just to see the message from Jane Doe, and then have to re-lock the device. Thus, as a second option, the electronic device 300 has the capability to biometrically verify the user of the device and display the redacted content once the user has been verified. As stated, in some embodiments, the button 315 functions as a biometric reader in order to read biometric data. Specifically, the button 315 includes a fingerprint and/or thumbprint reader. In some embodiments, the button 315 servers various additional functions for the device. For instance, the button may be used to activate the device from power-saving mode (when no messages are received), return to a home page of the device operating system from which applications may be selected, as well as other functions.

The third stage 330 illustrates the user having placed her thumb 325 on the button 315. At this point, the button 315 reads the thumbprint of the user and the device (e.g., a biometric verification engine operating on the device such as that shown in FIG. 1) performs a verification process to determine whether the user's thumbprint matches data stored for allowed users of the device. As illustrated in the third stage 330, the thumbprint is verified and the display screen 305 now shows the full SMS message from Jane Doe. That is, with the biometric data verified, the device displays the content in non-redacted form.

Figure 4:
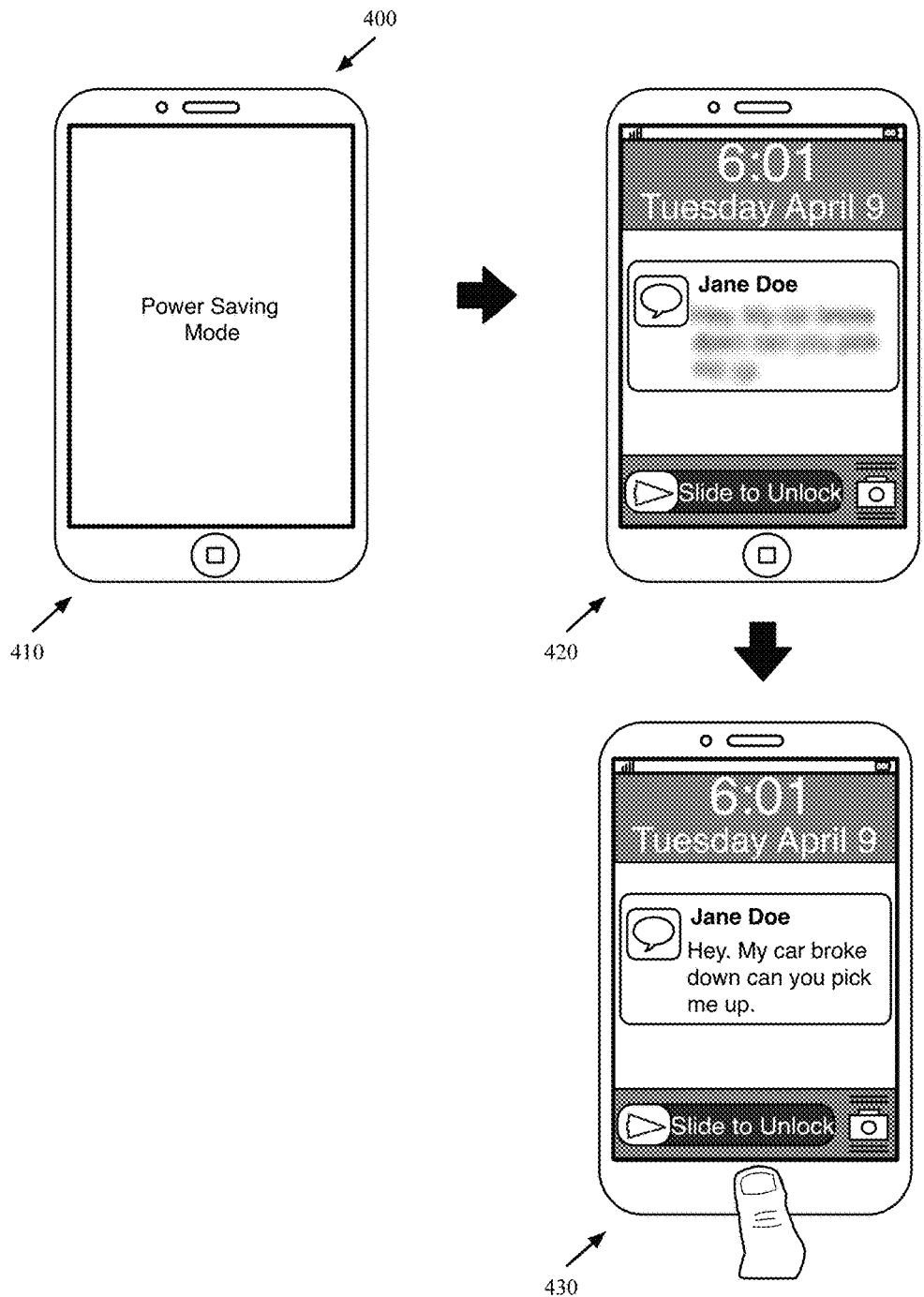

FIG. 4 illustrates a similar situation as that of FIG. 3, for an electronic device 400 over three stages 410-430. In this case, the first and third stages 410 and 430 are the same as the corresponding stages 310 and 330 of FIG. 3, with the device 400 in power saving mode in the first stage 410 and displaying a message in the locked-screen notification center, in non-redacted form, in the third stage 430. In the second stage 420, however, the device 200 displays the message from Jane Doe using a different redaction technique. Specifically, rather than not displaying the message content at all, the device 400 displays the content in a blurred, unreadable form.

One of ordinary skill in the art will realize that while two techniques for displaying redacted content are shown in these two figures (blurring the redacted content and removing the redacted content), different embodiments may use different techniques (e.g., using black bars over redacted content, applying an effect other than a blur to make the content unreadable, etc.). Furthermore, as will be described in greater detail below, various embodiments may redact content in situations other than the notification center display.

II. Content Redaction Process

Figure 5:
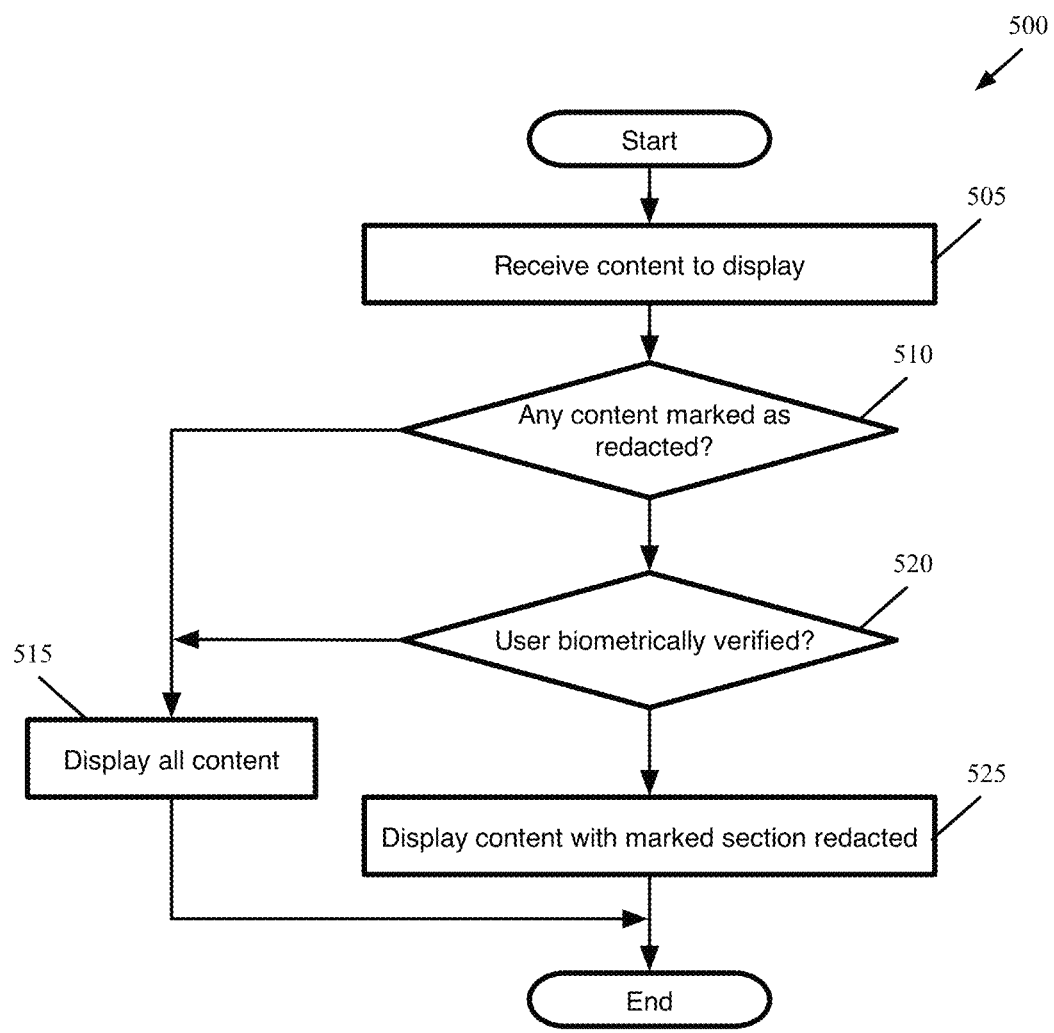
FIG. 5 conceptually illustrates a process of some embodiments for displaying content on an electronic device that redacts content for non-verified users.

FIG. 5 conceptually illustrates a process 500 of some embodiments for displaying content on an electronic device that redacts content for non-verified users. In some embodiments, the process 500 is performed by a content redaction engine such as that shown in FIG. 1 above. Some embodiments perform the process 500 (or a similar process) for all content to be displayed. Other embodiments only perform the process for content in specific situations (e.g., notification center messages).

As shown, the process 500 begins by receiving (at 505) content to display. This content may be text content, such as a portion of a text message or e-mail as shown in the previous section. The content may also be graphical (e.g., an image, an emoticon or similar image within a text message, etc.), or a different type of text content (i.e., a document file rather than a message).

The process determines (at 510) whether any of the content is marked as redacted. In some embodiments, the process determines whether any of the content should be redacted based on how the content will be displayed. That is, when the content will be displayed in a particular mode of the device, or displayed by a particular application of the device, then some or all of the content will automatically be marked as redacted. In the example of the previous section, any message content displayed in the notification center when the device is in locked-screen mode gets marked for redaction. Additionally, some embodiments automatically identify particular types of personal details, or other types of content, to redact (e.g., phone numbers, account numbers, e-mail addresses, etc.). Furthermore, in some embodiments a user may specifically mark content for redaction, on that user's device and/or when sent to another user's device.

When no content is marked for redaction, the process 500 displays (at 515) all of the received content in normal fashion. On the other hand, when at least some of the content is marked for redaction, the process determines (at 520) whether the user is biometrically verified. Different embodiments may use different biometric markers for such verification. As shown in the previous sections, the electronic device of some embodiments includes a fingerprint/thumbprint reader that also functions as an input button. Other embodiments may include a separate fingerprint/thumbprint reader, an iris scanner, a DNA scanner, a voiceprint identifier, or other biometric reader.

In order to determine whether the user is biometrically verified, the device first determines whether any biometric data is being read by the biometric reader. Of course, if no biometric data is provided, then no user can be biometrically verified (e.g., if nobody is in the room with the device, if the owner ignores the device, etc.). If the device does receive biometric data, then the device (e.g., the device's biometric verification engine) compares the received biometric data with stored data for one or more verified users. In some embodiments, a device can have multiple verified users (e.g., a parent and child for a child's phone, a couple may both have access to each other's phones, a shared family computing device, etc.). Furthermore, the content could have different permissions for different users (e.g., only some users may be allowed to view the content).

When the user is biometrically verified, the process 500 displays (at 515) all of the received content in normal fashion, as if none of the content was marked for redaction. On the other hand, when no user is biometrically verified (either because received biometric data does not match a user with permission to view the content, or because no biometric data is received), then the process displays (at 525) the content with the marked section redacted. As mentioned, the device may redact the content for output by not displaying the content at all, by blurring the content to render it undiscernible, by displaying a black bar over the content, or by using a different technique.

In some embodiments, after verifying a user to view content, the device does not continue to display the content once the biometric data of the verified user is removed from the reader. That is, in the example of a fingerprint/thumbprint reader, once the user removes their finger/thumb from the reader, the device subsequently redacts the content (i.e., reapplies the blur or other effect, removes the content from display, etc.). Thus, such embodiments do not allow a grace period during which the user can view the content without providing the required biometric input.

Figure 6:
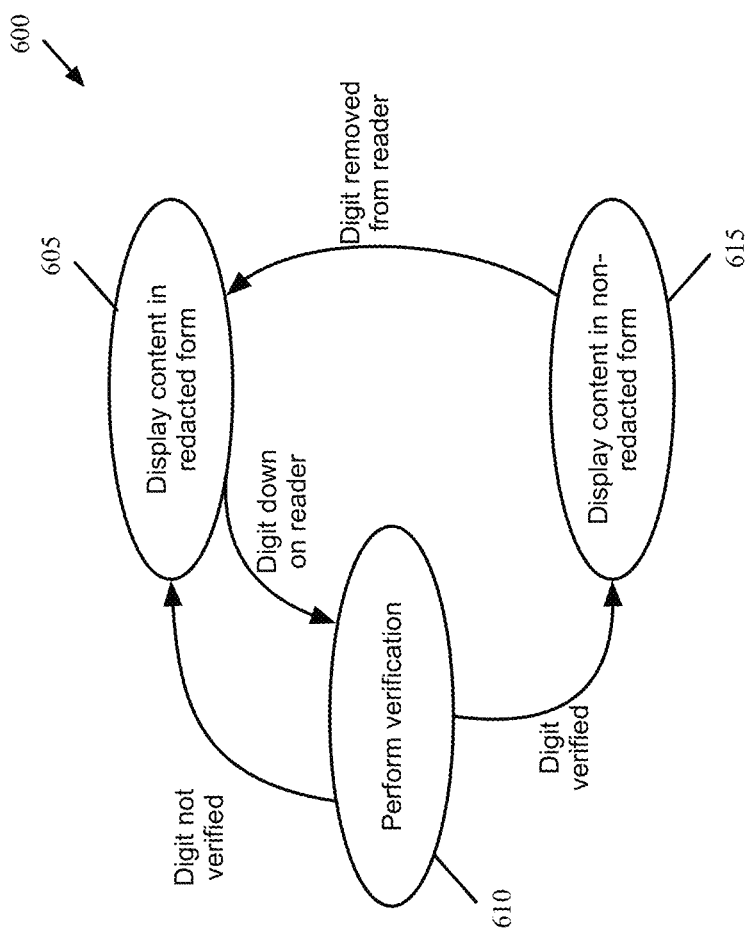
FIG. 6 conceptually illustrates a state diagram for the electronic device of some embodiments.

In some embodiments, the display and redaction is an event-driven process. FIG. 6 conceptually illustrates a state diagram 600 for the electronic device of some embodiments. The state diagram 600 will be described in part by reference to FIG. 7, which illustrates an electronic device 700 that displays a notification display with redacted text, over three stages 710-730.

One of ordinary skill will recognize that the state diagram 600 does not cover all possible states of an electronic device. The state diagram 600 specifically relates to the display of content, at least some of which is marked for redaction unless the device receives verified biometric data. Thus, all of the states in this figure assume that the device is turned on and displaying such content. Furthermore, the state diagram 600 does not cover various manipulations of the content that could be performed (e.g., zooming in, editing, etc.).

Figure 7:
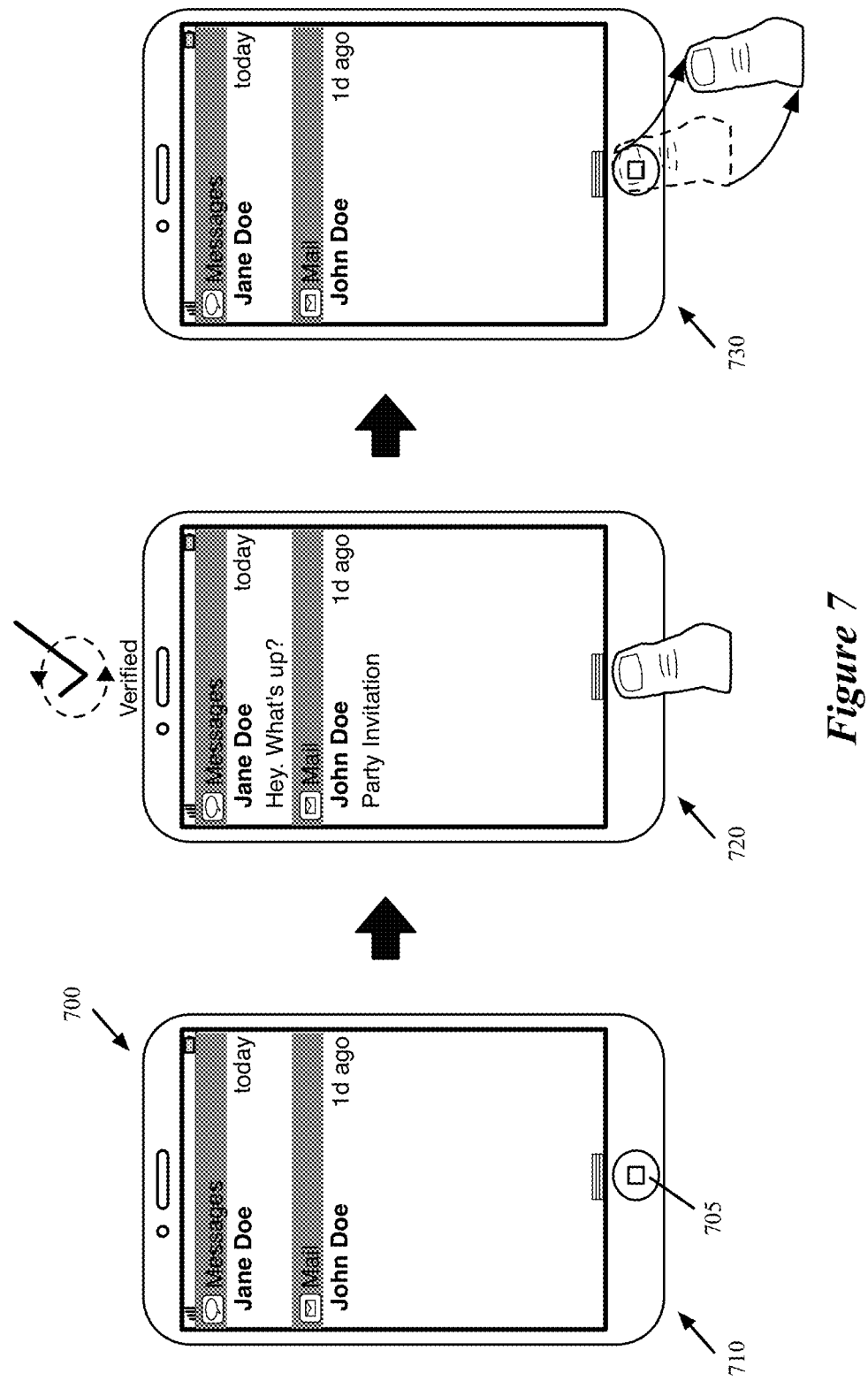
FIG. 7, which illustrates an electronic device that displays a notification display with redacted text.

In the state diagram 600, when the device is not receiving any biometric data, the electronic device displays its content in redacted form at state 605. The first stage 710 of FIG. 7 illustrates that the electronic device displays a notification center display with both an SMS message from Jane Doe and an e-mail from John Doe. As mentioned previously, the notification center of some embodiments may include various different types of notifications, including e-mails, SMS messages, missed calls, etc. In this first stage 710, the content is redacted because no user is biometrically verified.

Returning to the state diagram 600, when a digit is placed on the fingerprint and/or thumbprint reader, the electronic device transitions to state 610, to perform verification of the received biometric information. While this state diagram describes a fingerprint/thumbprint reader, other embodiments may use other biometric sensors (e.g., iris scanner, etc.), as described above. In some embodiments, the act of a person placing her thumb or finger on the reader causes an event in the electronic device that initiates the verification process. The device performs the verification process, as described above, by comparing the biometric data from its biometric reader to stored biometric data for verified users.

As shown, when the digit placed on the biometric reader is not verified, the process transitions back to state 605 to continue displaying the content in redacted form. Thus, when a non-owner, who has not been granted permissions by the owner, picks up a device, the non-owner cannot view any of the redacted content.

On the other hand, when the device verifies the biometric data, the device transitions to state 615, and displays the content in non-redacted form. The second stage 720 of FIG. 7 illustrates that a verified user has placed her thumb over the button 705, which also functions as a thumbprint/fingerprint reader, of the electronic device 700. As a result, the device verifies the user's thumbprint data and displays the previously redacted message content (both for the message from Jane Doe and the e-mail from John Doe).

When the user removes the digit from the biometric reader, the electronic device immediately transitions from the state 615 to the state 605 to display the content in redacted form. That is, there is no intermediate waiting period state, during which the device displays redacted content is non-redacted form. Instead, some embodiments generate an event when the digit is removed from the thumbprint/fingerprint reader, and send this event to the content redaction engine to redact any displayed content tagged as such.

The third stage 730 of FIG. 7 illustrates this transition. As shown by the dashed outline of the user's thumb, the user has just recently removed her thumb from the biometric reader 705. However, the electronic device is already displaying the messages in redacted form (i.e., without the message content). As soon as the user removes her thumb from the device, the device redacts the messages. Thus, if the user sets the device down and walks away, there is no opportunity for someone else to view the message content.

III. Content Redaction Tool

In addition to the situations described in the previous sections, in which message content is automatically redacted by a device based on context (e.g., all messages in the locked-screen mode notification center), some embodiments provide a content redaction tool that allows a user to select certain content (e.g., content within a document, etc.) for redaction. The redaction tool of some embodiments additionally allows the user to specify different viewing permissions for different redacted content (e.g., allowing only certain users of the device to view content, or allowing the content to be viewed only on specific other devices.

Figure 8:
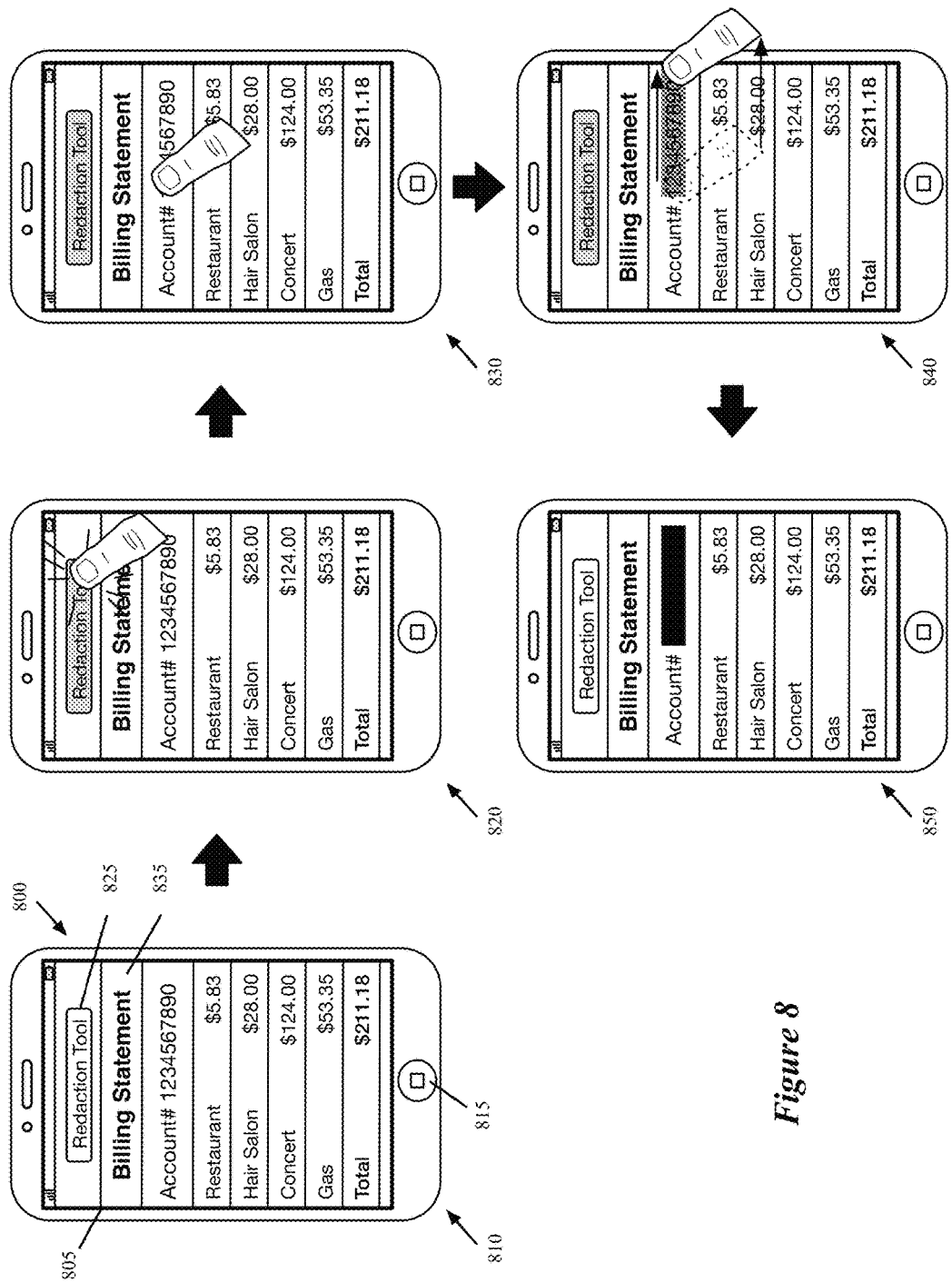
FIG. 8 illustrates the use of a redaction tool to redact content on an electronic device.

FIG. 8 illustrates the use of such a redaction tool to redact content on an electronic device 800 over five stages 810-850. Over the course of these five stages, a user of the electronic device activates a redaction tool and then selects content for redaction. The electronic device 800, like those shown in previous figures, includes a touchscreen 805 and a hardware input button 815 that functions as a fingerprint/thumbprint reader.

In the first stage 810, the electronic device 800 displays a document 825. In this example, the document is a credit card statement. In some embodiments, documents that can be redacted may include web pages or other publicly available documents, local documents (e.g., notes, text files, PDF documents, etc.), messages (e.g., e-mails, SMS messages, application-specific messages, etc.), as well as other types of documents. When redacting a publicly available web page, the redaction tool redacts the document for viewing on the particular user device. For instance, a user might view an online bank statement which is not a document separate from the web page on which it is displayed, but is also not truly public in that it is only accessible via an authentication process. For extra protection, a user might want to redact the bank account number on the online statement.

In FIG. 8, the displayed credit card billing statement 825 is a document local to the user of the device. In some embodiments, such documents are stored locally on the device itself. However, in other embodiments, these documents may not actually be stored on the device itself, but rather are stored remotely and associated with an account, with which the user's device is also associated (i.e., stored in a cloud storage).

In addition to the document 825, the display screen 805 also displays a selectable item 835 that enables a user to activate a redaction tool. The second stage 820 illustrates the selection of this item 835 in order to activate the redaction tool for the device. The redaction tool is implemented differently in different embodiments. Some embodiments implement the redaction tool as an application in which the user can open documents in order to redact portions of the documents. In other embodiments, the redaction tool is available across numerous other applications (e.g., a web browser application, e-mail application, SMS messaging application, etc.), as a selectable option within those applications. In some such embodiments, the redaction tool is a feature provided by the operating system of the device.

The second stage 820 illustrates a user selecting the item 835 in order to invoke the redaction tool. In addition, while this figure illustrates the redaction tool as being invoked by a selectable touchscreen item 835 (also referred to as an affordance), in other embodiments the tool might be invoked via other techniques (e.g., a particular touchscreen gesture, selection with a cursor controller, keyboard hotkey, or other input on a non-touchscreen device, etc.).

In the third stage 830, the redaction tool is activated, as indicated by the device displaying the selectable item 835 in a darker color. In order to use the activated redaction tool, the user performs a touchscreen selection gesture (i.e., a drag gesture across content) in order to select a particular portion of the displayed content. As shown in the fourth stage 840, the user moves her finger over the touchscreen 805 from the start (left edge) to end (right edge) of the account number on the billing statement in order to select this content. The fourth stage 840 illustrates that this content is selected by showing the darker highlighting of the content.

Finally, the fifth stage 850 illustrates the redaction of the selected text. In the illustrated embodiment, the device redacts the account number by overlaying a black bar on top of the redacted content. As shown in the examples above, different embodiments may use other techniques to redact content, such as removing the content or blurring the content. In addition, some embodiments provide several different redaction options for the user to choose from (e.g., blur, black bar, or removal).

Figure 9:
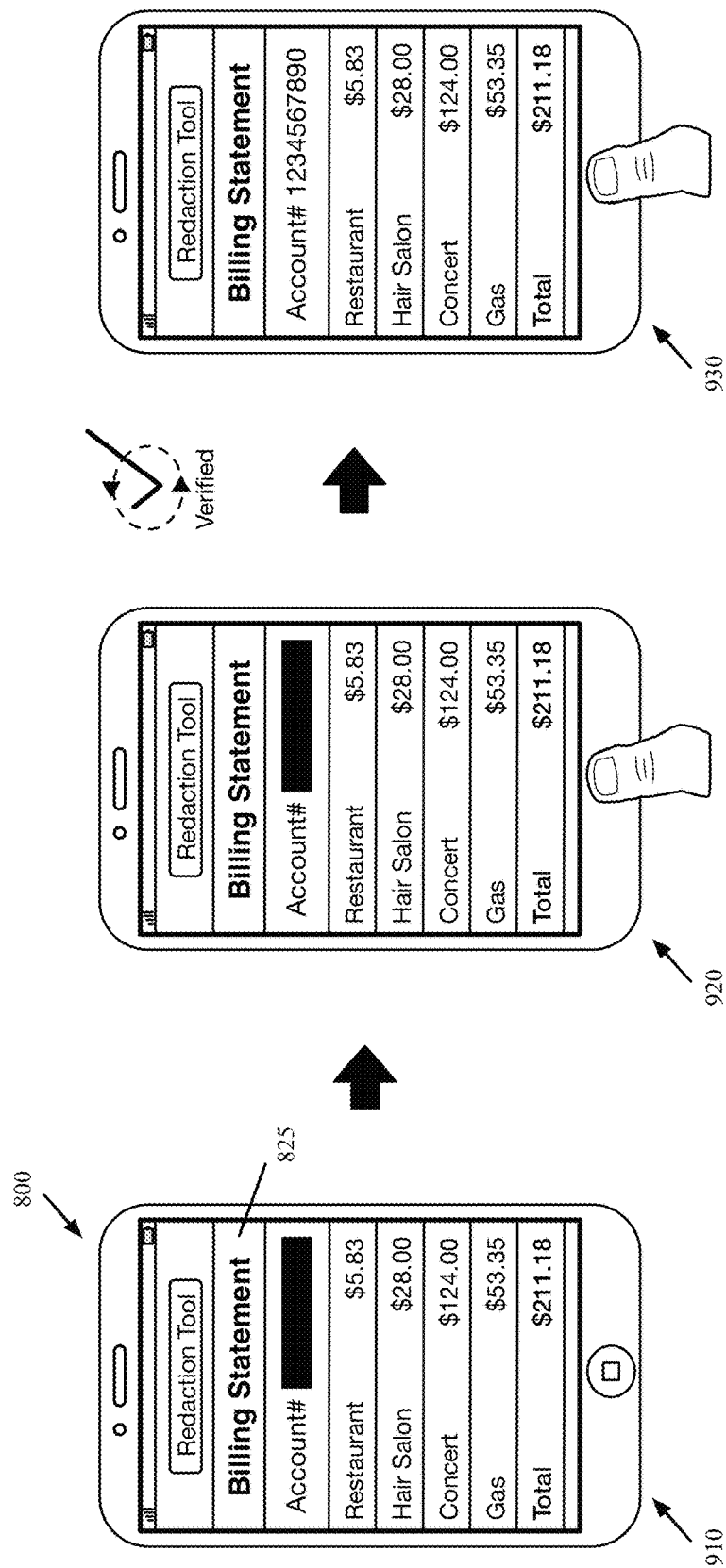
FIG. 9 illustrates the electronic device of FIG. 8, in which a user is granted access to the redacted content.

Once the content in a document has been marked as redacted, the content will only be displayed on the device when the biometric reader of the device detects a verified user's biometric data. FIG. 9 illustrates three stages 910-930 of the electronic device 800, with the same document 825 displayed as in the previous figure. The first stage 910 is similar to the final stage 850 of FIG. 8, with the account number redacted via the display of a black bar. In the second stage 920, the user places a digit over the biometric reader button 815. As shown in the third stage 930, the user's digit is verified by comparison to stored thumbprint/fingerprint data, and therefore the electronic device grants access to the redacted content, displaying the account number.

Figure 10:
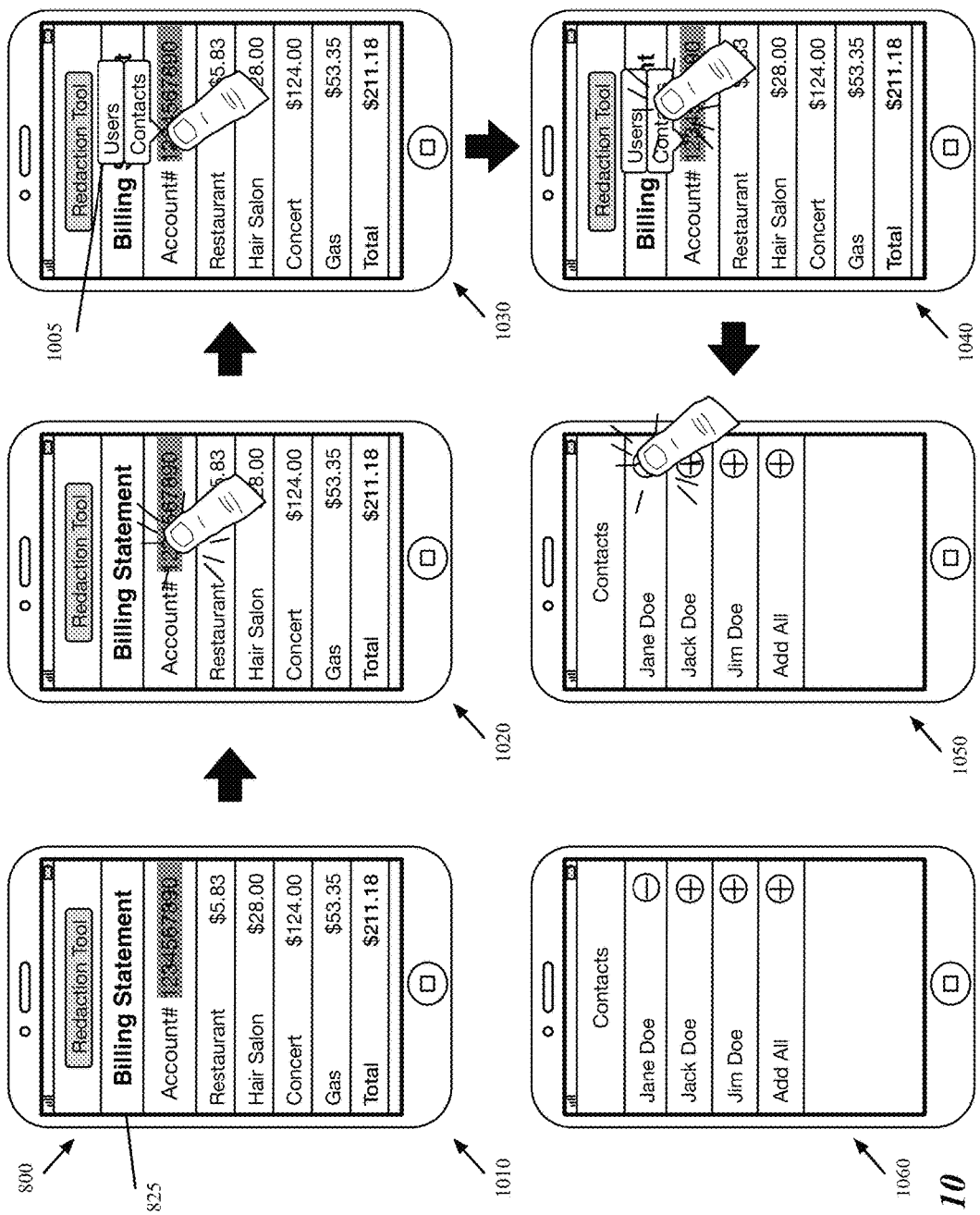
FIG. 10 illustrates a user selecting a portion of content marked for redaction, then associating that content with a user of a different device.

In this example, the redacted document is only viewed on the device of the person who redacted the content in the first place. However, some embodiments additionally enable the user who marks content as redacted to set different permissions for (i) different users of the device and (ii) different devices belonging to others and associated with other accounts. FIG. 10 illustrates an example of the latter over five stages 1010-1060 of the electronic device 800. This figure illustrates the user selecting a portion of content marked for redaction, then associating that content with a user of a different device.

The first stage 1010 illustrates the same document 825 displayed on the device 800, with the redaction tool active. In addition, at this stage, the user has selected the account number for redaction. In this case, unlike that shown in FIG. 8, the device does not automatically display the black bar over the redacted text yet. However, the account number is nevertheless highlighted to indicate that it has been selected for redaction.

At the second stage 1020, the user selects the redacted text (in this case, by tapping the text). In some embodiments, the device responds differently to different selection gestures (e.g., tap, double tap, press and hold) over redacted content. As shown in the third stage 1030, this selection brings up a menu 1005 to select either contacts or users in order to grant permissions to others to view the redacted text. In some embodiments, other gestures enable a user to perform such actions as removing redaction from content (i.e., setting the content to no longer be redacted).

In the fourth stage 1040, the user selects (again with a tap gesture) the Contacts option in the menu 1005. As the fifth stage 1050 shows, this brings up a Contacts page 1015 that lists the contacts for the user of the device. In this simplified example, the user has three contacts (Jane Doe, Jack Doe, and Jim Doe). Next to each of the contacts is a "+" sign selectable item, that allows the user to add the particular contact as permitted to view the redacted text. In addition to the options to add single contacts, the contacts page 1015 also presents the option to add all of the contacts, thereby making the redacted content viewable on the device of any contacts to whom it is sent.

In the fifth stage 1050, the user selects the add contact icon for Jane Doe, thereby granting Jane Doe permission to view the redacted content on her device. The sixth stage 1060 illustrates that the "+" sign icon for Jane Doe has changed to a "−" sign, that the user can select in order to remove Jane Doe from the users permitted to view the content.

The redaction tool of some embodiments, as illustrated in FIG. 10, allows a user to grant different permission to different contacts (i.e., users of different devices on which a document may be viewed) as well as different permissions to different users of the current device. While not shown, in some embodiments the user can select the "users" option in menu 1005 in order to cause the device to present a list of users of the device. In some embodiments, the owner of a device may set up multiple users for the device, and may wish to only grant certain users of the device permission to access redacted content. For instance, parents might want to allow each other to view certain information while preventing their children from viewing that information on a shared device. Thus, in a similar fashion to selecting certain contacts that can view redacted content on their different devices, the user may select certain users that can view redacted content on the same device.

Figure 11:
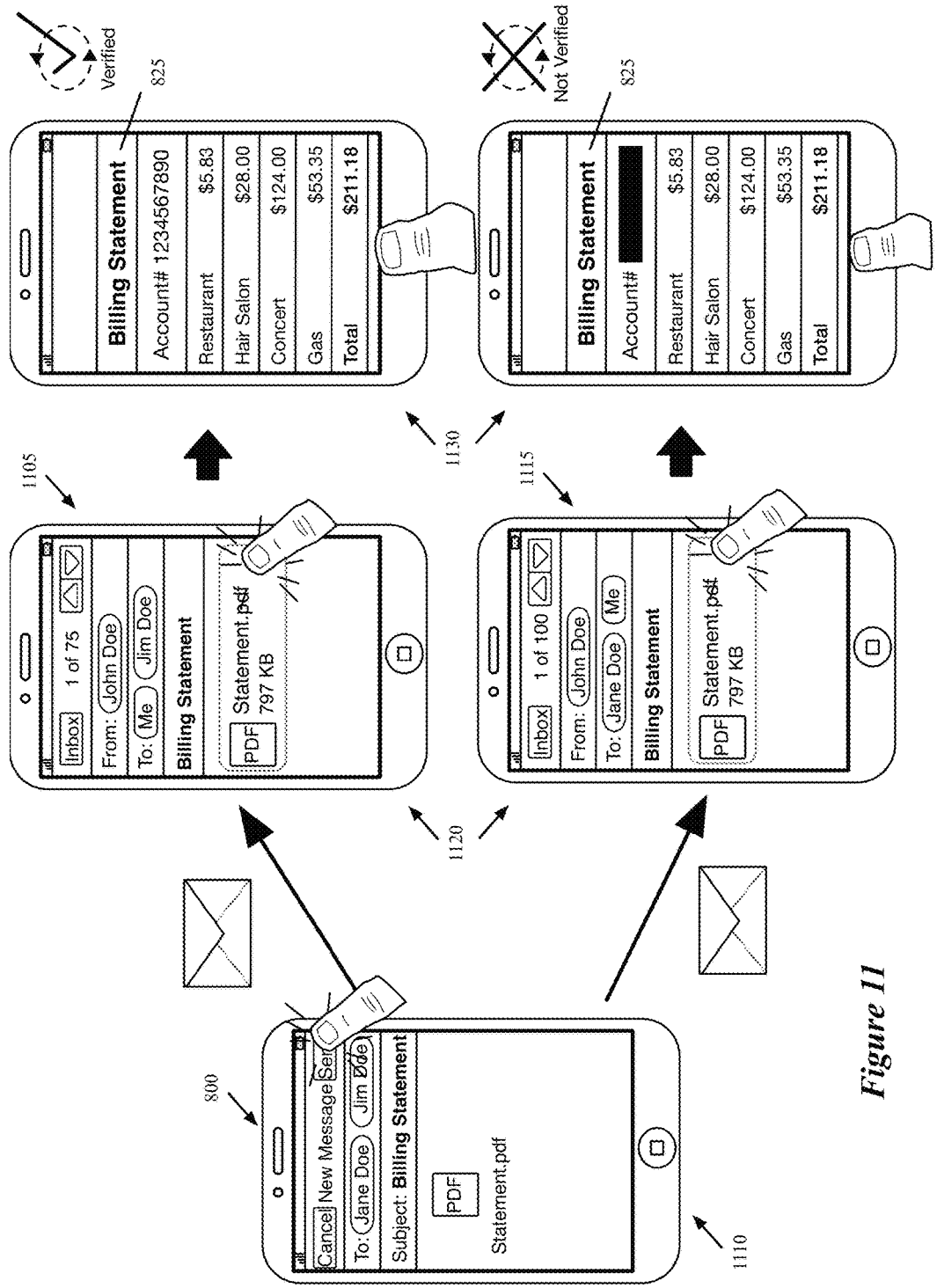
FIG. 11 illustrates the application of the user-selected permissions from FIG. 10 for two different contacts of the user.

FIG. 11 illustrates the application of the user-selected permissions from FIG. 10 for two different contacts of the user, over three stages 1110-1130. In the first stage 1110, the user of electronic device 800 prepares and sends an e-mail to two contacts, Jane Doe and Jim Doe. This e-mail includes as an attachment the credit card billing statement document from the previous figures, which the user of electronic device 800 redacted. As shown in the previous FIG. 10, the user of the electronic device 800 redacted the account number from the document and set permissions allowing Jane Doe to view the redacted content.

The second stage 1120 illustrates both electronic device 1105 owned by Jane Doe (on top) and electronic device 1115 owned by Jim Doe (on the bottom). In both cases, the user of the electronic devices 1105 and 1115 receives the e-mail from John Doe with the redacted credit card billing statement document attached. In addition, both Jane Doe and Jim Doe select the document in order to open the document on their respective devices. While shown as occurring at the same stage of the figure, one of ordinary skill will recognize that the receipt of the e-mail and opening of the document may occur at completely different times on the two recipients' respective devices.

The third stage 1130 illustrates the document 825 open on both Jane Doe's device 1105 and Jim Doe's device 1115. In addition, both users have placed their respective thumbs over the biometric readers 1125 and 1135 of their respective devices in order to view the redacted portion of the document. In the upper portion of the figure, Jane Doe places her thumb on the biometric reader 1125, and the device 1105 verifies that she has permission to view the redacted account number. On the other hand, Jim Doe places his thumb on the biometric reader 1125, and is not verified to view the redacted account number, because the sender John Doe did not grant him permission. In some embodiments, the biometric verification engine of the device 1115 verifies that the correct user (Jim Doe) is providing his biometric data, but the content redaction engine outputs the content in redacted form anyway, because the verified user does not have permission to view the content.

Figure 12:
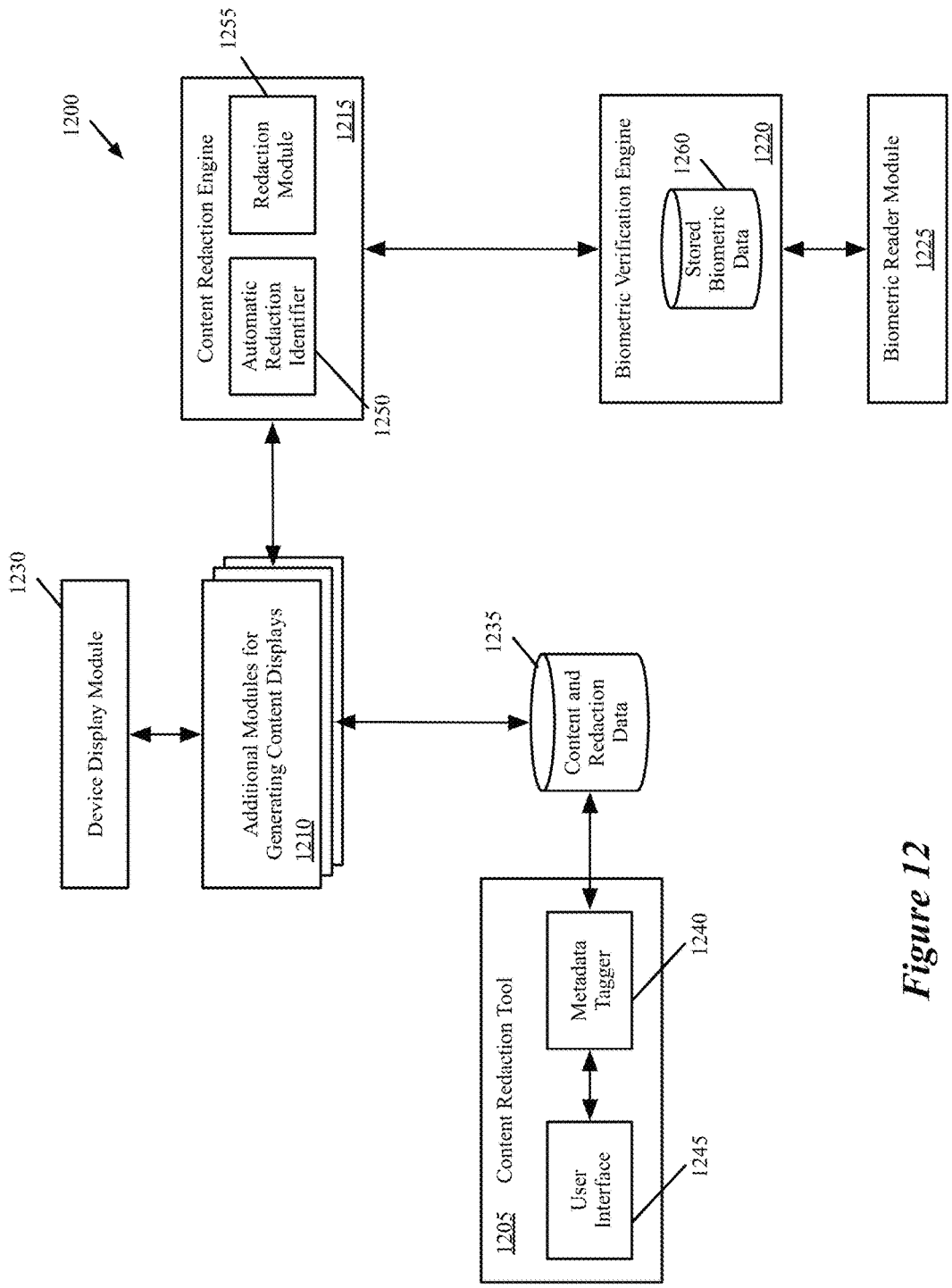
FIG. 12 conceptually illustrates the software architecture of an electronic device that includes a content redaction tool, content redaction engine, and biometric verification engine.

FIG. 12 conceptually illustrates the software architecture of an electronic device 1200 that includes a content redaction tool, in addition to the content redaction engine and biometric verification engine shown in FIG. 1. As shown, the software architecture of the electronic device 1200 includes a content redaction tool 1205, a set of additional modules 1210 for generating content displays, a content redaction engine 1215, a biometric verification engine 1220, a biometric reader module 1225, and a device display module 1230. In addition, the device includes a storage for storing content and associated redaction data 1235.

The content redaction tool 1205 of some embodiments enables users to interact with various content displayed on the electronic device 1200 in order to redact that content. As such, the content redaction tool 1205 includes a user interface 1245 and a metadata tagger 1240. The user interface 1245 enables the provision of the content redaction tool to the user, and receives input when the tool is activated. As shown in FIGS. 8 and 10, the user input may include selecting content for redaction (e.g., within a document), as well as applying various permission data to the redacted content. That is, through the content redaction tool user interface 1245, a user of the electronic device 1200 may highlight or otherwise select content for redaction and select specific users of the device or owners/users of other devices that may view (or be prevented from viewing) the redacted content.

The metadata tagger 1240 translates the information received through the user interface into redaction data stored with the content at the device. For instance, the metadata tagger 1240 may tag a specific content portion as redacted, and may attach permissions to the redaction data. As shown, the metadata tagger 1240 of some embodiments stores this information within the content and redaction data 1235 stored on the device. In some embodiments, this storage 1235 represents various document files. The metadata tagger 1240 of some embodiments modifies the document files themselves in order to store the redaction and permissions data. In other embodiments, the metadata tagger 1240 accesses a different data structure (e.g., a database) that stores redaction information for numerous files.

Figure 13:
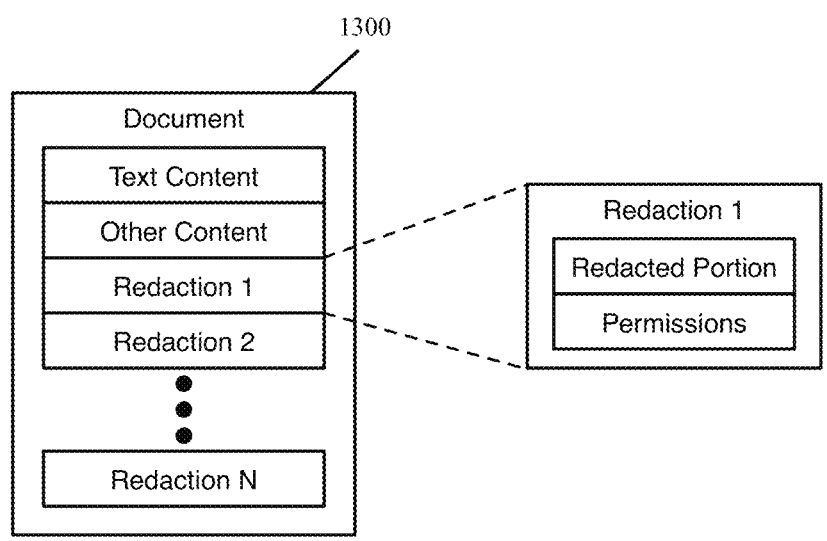
FIG. 13 conceptually illustrates a data structure of a document that stores redaction data in the document.

FIG. 13 conceptually illustrates a data structure of a document 1300 that stores redaction data in the document. As shown, the document 1300 includes both text content and other content. This other content may include vector graphics content, raster image content, etc. In addition, the types of content may not necessarily be separated. For instance, the graphical content may be intertwined with the text content, depending on the document format. In addition to the content, the document 1300 includes several sets of redaction data. In some embodiments, each time a user selects a different portion of the document for redaction, the content redaction tool 1205 generates separate redaction data within the document. Each set of redaction data includes the redacted content portion as well as permissions data for the redacted portion. In the examples shown in FIGS. 8-11, the redaction information would include an indication of the specific content (the account number) redacted, as well as an indication that only the user of the device 800 and the contact Jane Doe are allowed to view the content when biometrically verified. In some embodiments, this may be implemented as an HTML or XML tag around the redacted content, with data fields for the permissions data.

The various modules 1210 for generating content displays, in some embodiments, are different applications, aspects of the device operating system, etc. that generate displays of content that could be redacted. For instance, these modules could include a document viewer and/or editor, an e-mail client application, a notification center, a web browser, etc. These modules may pull data from the storage 1235 for display, to send to the device display module 1230. In some embodiments, these various different modules use the content redaction engine 1215 to determine whether any of its content should be redacted.

The device display module 1230 of some embodiments translates the output of a user interface (e.g., a user interface of one of the modules 1210) for display (e.g., on a touchscreen of the electronic device 1200). That is, the display module 1230 receives signals describing what should be displayed and translates these signals into pixel information that is sent to the display device.

The content redaction engine 1215 includes an automatic redaction identifier 1250 and a redaction module 1255. The automatic 1250 redaction identifier of some embodiments receives content destined for output (e.g., from one of the modules 1210) and determines whether any of the content should be automatically redacted. For instance, the notification center of some embodiments may send its content to the redaction engine 1215, and the automatic redaction identifier 1250 identifies that the message content in the notification center should be automatically redacted (unless the device is currently receiving verified biometric input). In addition, the automatic redaction identifier 1250 of some embodiments identifies data such as phone numbers, e-mail addresses, physical addresses, account numbers, or other identifying information that should be redacted.

The redaction module 1255 performs the determination of whether to redact content and applies the proper redaction technique if necessary. The determination of whether to redact portions of content may be made for content detected by the automatic redaction identifier 1250 as well as content specified for redaction within a document (e.g., content tagged for redaction by the content redaction tool 1205). The redaction module receives data from the biometric verification engine 1220 that indicates whether the device is currently reading biometric data from a verified user. For content tagged for redaction, the redaction module of some embodiments additionally determines whether the user verified by the biometric data has permissions to view the redacted content. When the redaction module 1255 determines that the content should be redacted for display (because a verified user is not providing biometric input, or because the biometric input is not from a user with permission to view the content), the redaction module 1255 applies a redaction technique (e.g., blurring, removal, etc.) to the content for display.

In some embodiments, the content redaction engine 1215 is part of the operating system of the device. When an application or operating system module has content to display, that module sends the content to the content redaction engine 1215 for the application of any necessary redaction. In other embodiments, the content redaction engine is part of a specific module of the operating system or a specific application. For instance, the content redaction engine of some embodiments is part of the notification center (which itself may be a part of the operating system).

The biometric verification engine 1220, as described above by reference to FIG. 1, receives biometric data from the biometric reader module 1225. The biometric verification engine 1220 compares the received biometric data to stored biometric data 1260 for one or more verified users. When the received data is close enough to the stored data to be considered a match for a user, the verification engine determines that the current person inputting their biometric data to the device's biometric reader is verified as a particular user. The biometric verification engine 1220 of some embodiments sends this data to the content redaction engine 1215 when requested, in some embodiments. In addition, when the biometric reader of the device is not receiving any data, the biometric verification engine may report this data to the content redaction engine 1215.

The biometric reader module 1225 of some embodiments translates input data from the biometric reader of the device (e.g., a fingerprint/thumbprint reader, iris scanning camera, etc.) into data usable by the biometric verification engine 1220 for comparison to stored data. The biometric reader module then sends the translated data to the verification engine 1220. In some embodiments, when the user removes the biometric input (e.g., removes a finger/thumb from the reader), the biometric reader module 1225 generates an event that is sent to the biometric verification engine 1220 so that the verification engine 1220 can notify other modules to cease any behavior based on such verification (e.g., instructing the content redaction module 1215 to redact any content marked for redaction).

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
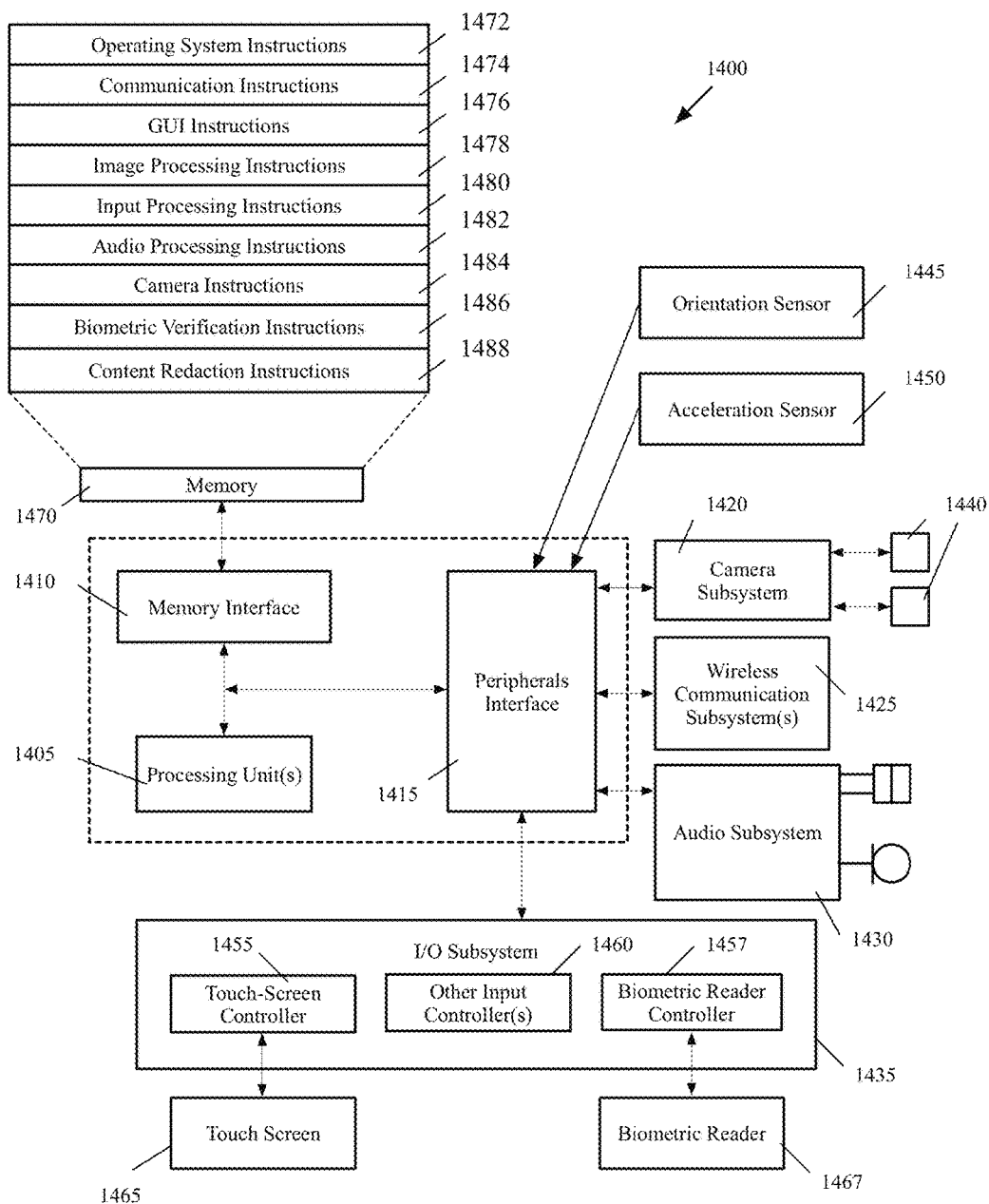
FIG. 14 illustrates an example of an architecture of a mobile computing device with which some embodiments are implemented.

The redaction of content and biometric access to the redacted content of some embodiments operates on mobile devices, such as smart phones (e.g., iPhones®) and tablets (e.g., iPads®). FIG. 14 is an example of an architecture 1400 of such a mobile computing device. Examples of mobile computing devices include smartphones, tablets, laptops, etc. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) are coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wireless communication subsystem 1425 serves to facilitate communication functions. In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio. Additionally, the audio subsystem 1430 is coupled to a microphone to facilitate voice-enabled functions, such as voice recognition (e.g., for dictation), digital recording, etc.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455, a biometric reader controller 1457, and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. Some embodiments include a near-touch sensitive screen and a corresponding controller that can detect near-touch interactions instead of or in addition to touch interactions.

The biometric reader controller 1457 is coupled to a biometric reader 1467. The biometric reader controller detects biometric input to the biometric reader 1467 using any of multiple different biometric reading technologies. For instance, the biometric reader in different embodiments may be a thumbprint and/or fingerprint reader, an iris scanner, a voiceprint reader, etc. The other input controllers 1460 are coupled to other input/control devices, such as one or more buttons. In some embodiments, the biometric reader (e.g., a thumbprint and/or fingerprint reader) is a part of one of these buttons.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1472. The OS 1472 of some embodiments includes instructions for handling basic system services and for performing hardware dependent tasks.

The memory 1470 also includes communication instructions 1474 to facilitate communicating with one or more additional devices; graphical user interface instructions 1476 to facilitate graphic user interface processing; image processing instructions 1478 to facilitate image-related processing and functions; input processing instructions 1480 to facilitate input-related (e.g., touch input, biometric input) processes and functions; audio processing instructions 1482 to facilitate audio-related processes and functions; camera instructions 1484 to facilitate camera-related processes and functions; biometric verification instructions 1486 to facilitate the verification of biometric data; and content redaction instructions 1488 to facilitate the redaction of content and granting of access to content based on biometric data. The instructions described above are merely exemplary and the memory 1470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such machine-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The machine-readable media may store a program that is executable by at least one processing unit and includes sets of instructions for performing various operations. Examples of programs or code include machine code, such as is produced by a compiler, and files including higher-level code that are executed by a computer, an electronic component, or a microprocessor using an interpreter.

While the above discussion refers in part to microprocessor or multi-core processors that execute software, some embodiments are performed by one or more integrated circuits, such as application specific integrated circuits (ASICs), customized ASICs or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, some of the figures illustrate various touch gestures (e.g., press and hold gestures, touch movements, etc.). However, many of the illustrated operations could be performed via different touch gestures (e.g., a tap rather than a press-and-hold, etc.) or by non-touch input (e.g., using a cursor controller, a keyboard, a touchpad/trackpad, a near-touch sensitive screen, etc.). In addition, a number of the figures (including FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A machine implemented method comprising:
storing a set of content for display on a device in a locked screen mode of the device, wherein at least a portion of the set of content is marked for redaction;
displaying the set of content with the marked portion redacted on the device in the locked screen mode;
receiving biometric verification data indicating whether a user of the device is verified through biometric data; and
when the biometric verification data indicates that the user is verified, displaying the set of content without any portion redacted while the device remains in the locked screen mode.

2. The method as in claim 1 wherein the biometric verification data is provided by a biometric reader that includes a camera.

3. The method as in claim 2 wherein the camera is a scanning camera.

4. The method as in claim 3 wherein the content comprises a notification.

5. The method as in claim 3 wherein the content comprises a notification of a message.

6. The method as in claim 3 wherein the display of unredacted content displayed in the locked screen mode is switched to the display of redacted content as soon as the biometric reader is no longer receiving biometric verification data indicating that the user is verified.

7. The method as in claim 6 wherein the switch to the display of redacted content is caused by an event that indicates that the biometric reader is no longer receiving biometric verification data indicating that the user is verified.

8. The method as in claim 7 wherein the display of redacted content comprises displaying content without the marked portion.

9. The method as in claim 5 wherein a sender of the message is not redacted while at least a portion of the message is redacted when the biometric verification data indicates the user is not verified.

10. The method as in claim 1 wherein the redacted content is automatically marked for redaction based on a type of content.

11. The method as in claim 7 wherein the switch is caused when the user removes a biometric input.

12. The method as in claim 1 wherein the biometric verification data is provided by a biometric reader that includes a scanning camera and wherein the display of unredacted content displayed in the locked screen mode is switched to the display of redacted content in response to an event that indicates that the biometric reader is no longer receiving biometric verification data indicating that the user is verified; and wherein the display of redacted content comprises one of: (1) blurring the redacted content; (2) placing a black bar over the redacted content; or (3) removing the redacted content; and wherein the event is caused when the user removes a biometric input.

13. A non-transitory machine readable medium storing instructions which when executed by a data processing system cause the data processing system to perform a method comprising:
   storing a set of content for display on a device in a locked screen mode of the device, wherein at least a portion of the set of content is marked for redaction;
   displaying the set of content with the marked portion redacted on the device in the locked screen mode;
   receiving biometric verification data indicating whether a user of the device is verified through biometric data; and
   when the biometric verification data indicates that the user is verified, displaying the set of content without any portion redacted while the device remains in the locked screen mode.

14. The medium as in claim 13 wherein the biometric verification data is provided by a biometric reader that includes a camera.

15. The method as in claim 14 wherein the camera is a scanning camera.

16. The method as in claim 15 wherein the content comprises a notification.

17. The method as in claim 15 wherein the content comprises a notification of a message.

18. The method as in claim 15 wherein the display of unredacted content displayed in the locked screen mode is switched to the display of redacted content as soon as the biometric reader is no longer receiving biometric verification data indicating that the user is verified.

19. The method as in claim 18 wherein the switch to the display of redacted content is caused by an event that indicates that the biometric reader is no longer receiving biometric verification data indicating that the user is verified.

20. The method as in claim 19 wherein the display of redacted content comprises displaying content without the marked portion.

21. The method as in claim 17 wherein a sender of the message is not redacted while at least a portion of the message is redacted when the biometric verification data indicates the user is not verified.

22. The method as in claim 13 wherein the redacted content is automatically marked for redaction based on a type of content.

23. The method as in claim 19 wherein the switch is caused when the user removes a biometric input.

24. The method as in claim 13 wherein the biometric verification data is provided by a biometric reader that includes a scanning camera and wherein the display of unredacted content displayed in the locked screen mode is switched to the display of redacted content in response to an event that indicates that the biometric reader is no longer receiving biometric verification data indicating that the user is verified; and wherein the display of redacted content comprises one of: (1) blurring the redacted content; (2) placing a black bar over the redacted content; or (3) removing the redacted content; and wherein the event is caused when the user removes a biometric input.

* * * * *